Sept. 23, 1924.
W. H. CALDBECK
1,509,583
STORAGE BATTERY SEALING DEVICE
Original Filed Aug. 23, 1920
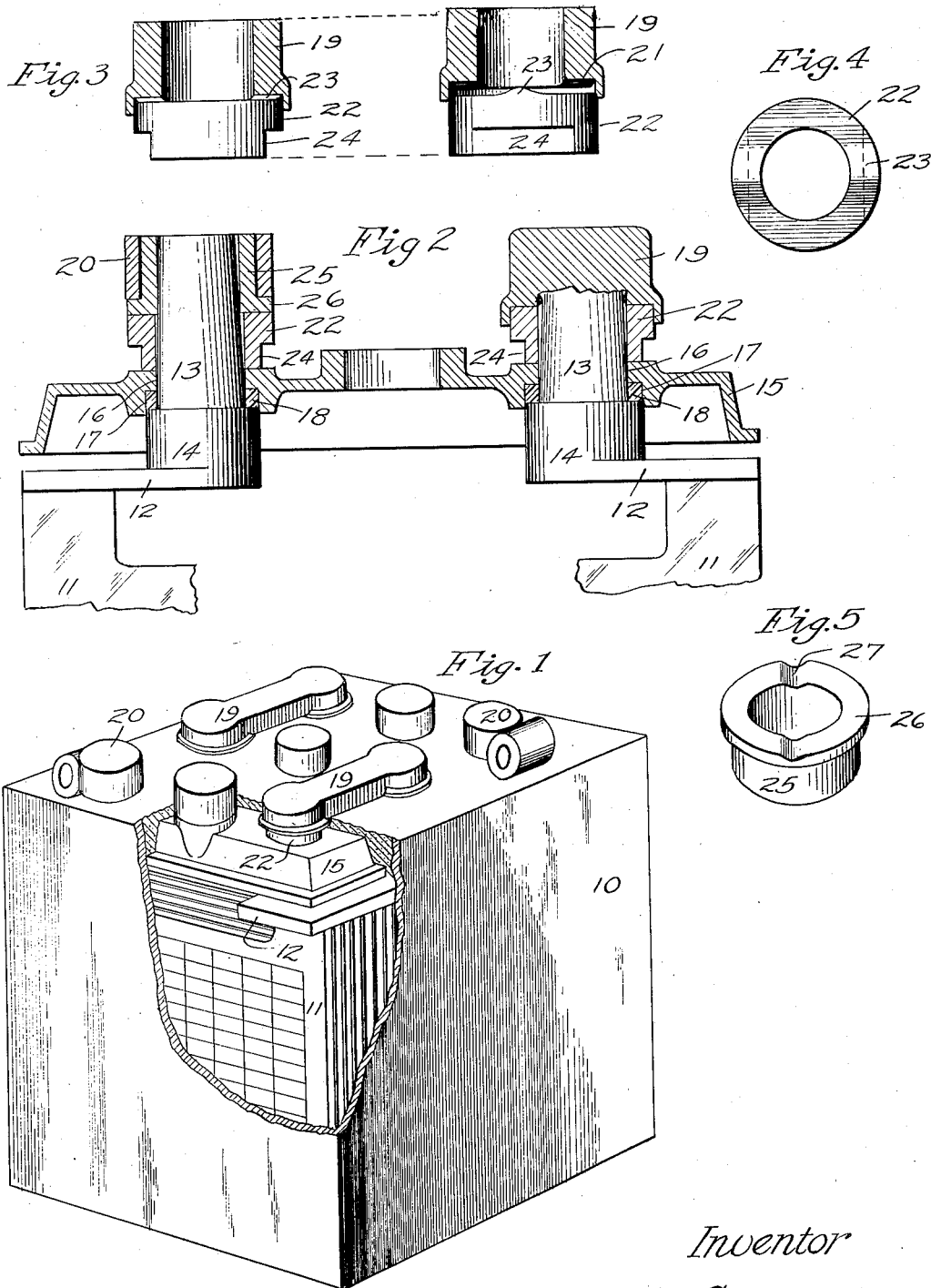
Witness
Lynn Latta
Inventor
Wendell H. Caldbeck
By Bair & Freeman Attorneys Patented Sept. 23, 1924.

1,509,583

UNITED STATES PATENT OFFICE.

WENDELL H. CALDBECK, OF DES MOINES, IOWA, ASSIGNOR TO VESTA BATTERY CORPORATION, OF CHICAGO, ILLINOIS, A CORPORATION OF ILLINOIS.

STORAGE-BATTERY-SEALING DEVICE.

Application filed August 23, 1920, Serial No. 405,429. Renewed July 12, 1923.

*To all whom it may concern:*

Be it known that I, WENDELL H. CALDBECK, a citizen of the United States, and a resident of Des Moines, in the county of Polk and State of Iowa, have invented a certain new and useful Storage-Battery-Sealing Device, of which the following is a specification.

The object of my invention is to provide a storage battery sealing device of simple, durable and inexpensive construction.

More particularly it is my purpose and object to provide a sealing device adapted for use with storage batteries, which will enable the ordinary parts now commonly in use to be used in the ordinary way, and will enable the connector members and terminal devices to be used and connected with the posts extended upwardly from the cells in the ordinary way, and will make the easy and thorough sealing of the posts with relation to the hard rubber cover members to be readily and easily and quickly accomplished, after the other parts have been assembled and connected.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a perspective view of a storage battery equipped with my sealing device, parts being broken away for better illustration.

Figure 2 shows a vertical, transverse, sectional view through the posts at one end of the battery, illustrating the sealing devices thereon.

Figure 3 shows a detail, sectional view of the sealing device, the different parts illustrating the sealing device in different positions.

Figure 4 shows a plan view of the upper surface of the sealing collar; and

Figure 5 shows an inverted plan view of the sleeve used in some instances as a part of my invention.

It will be understood that considerable difficulty is experienced in the assembling of a storage battery in sealing the posts which extend upwardly from the cells to the connector or terminal members in such a way as to make the top of the battery absolutely tight.

In Figure 1 of the drawings herewith, I have used the reference numeral 10 to indicate generally the casing of the battery. I have illustrated a battery of the three-cell, seven-plate type. The plates are indicated, as at 11.

The upper end of the different plate or plates of each cell are connected with a pillar strap 12 from which there extends upwardly a post 13, slightly tapered toward its upper end, having near its lower portion a shoulder 14. The post 13 at the opposite end of each cell projects through a hard rubber cover member 15, which has suitable openings to receive the post, indicated as at 16. The cover members 15 are provided with rabbets 17, at the lower part of each opening 16. These rabbets receive gaskets 18, as illustrated particularly in Figure 2.

The post 13 is connected at its upper end above the cover 15, either with another cell by means of a connector 19, or with a current conducting wire, by means of a terminal 20. In my claims herein, I intend to cover by the use of the word connector, either the connector of the type disclosed at 19, or the terminal, as disclosed at 20.

Both the connectors 19 and the terminals 20 have on their under surfaces, sockets to receive the upper ends of the posts, and are ordinarily thoroughly fixed and connected with the posts by heating and connecting them together by molten metal.

At the right-hand part of Figure 2, I have shown the post 13 sealed to the connector 19. It is desirable that the sealing connection between the post and the connector should be made with as little strain and effort as possible, so as to effect an efficient result. It is also necessary that the shoulder 14 should be drawn tightly against the gasket 18, and held there after the assembling of the battery has been completed.

It will be seen therefore that it is necessary in some way to draw the post upwardly, so as to draw the shoulder 14 tightly against the gasket. This is done in a great variety of ways and is sometimes done before the sealing is accomplished, and the sealing is done after the parts are tightly held together. This requires the use of complicated clamps and results quite frequently in a poor job.

Where my device is used, the connector 19 may be provided with spaced opposite grooves 21 in its under surface, having inclined surfaces. Before the connector is burned to the post, there is slipped over the post a sealing collar 22, having on its upper surface oppositely spaced, upwardly extending projections 23, having curved surfaces, and adapted in one position of the rotation of the sealing collar to be received in the respective recesses 21. The lower part of the collar 22 may have square portions 24 to receive a wrench.

In assembling the parts just described, the collar is placed over the post with the projections 23 received in the recesses 21. The connector 19 is then burned to the post. Thereafter a wrench is placed on the collar 22 and the collar is rotated, until the projections 23 ride out of the recesses 21 to their position illustrated in Figure 3 of the drawings at the right-hand portion thereof.

It will thus be seen that the rotation of the collar 22 will tend to force the shoulder 14 against the gasket tightly for effecting a proper seal.

At the left-hand part of Figure 2, I have shown a slightly different embodiment of my invention, which, however, is included in the spirit and purpose of my device.

Where it is desirable to use my device with terminals 20 of the ordinary kind, which can be readily purchased almost anywhere, I provide a sleeve 25, shown in inverted position in Figure 5, having a flange 26 at its lower edge, provided with recesses 27, similar to the recesses 21. The sealing collar 22 is placed on the post 13 in the manner already described, and the sleeve 25 is then placed on the collar, as shown at the left-hand side of Figure 2. The terminal 20 is then dropped over the sleeve 25, as illustrated at the left-hand side of Figure 2. I have shown the parts in Figure 2, as they would appear before the burning of the terminals to the post and the sleeve. The projections on the sealing collar are received within the recesses 27 of the sleeve and the parts are then ready for sealing the terminal, which is sort of a connector for the terminal connecting wire, to the post and to the sleeve 25.

After this burning has been accomplished, the sealing collar 22 is rotated by means of a wrench, in the manner hereinbefore described, for moving the projections 23 out of register with the recesses 27, and thereby forcing the shoulder 14 tightly against the gasket 18, and thereby tightly sealing or connecting the post to the cover 15.

It will be seen that where my improved sealing collar is employed, the post may be burned to the connector or terminal without paying attention to the clamping devices or anything of that sort, and in such manner that the whole attention of the mechanic can be given to the burning process, which should be very carefully done.

When the burning has been accomplished, the rotation of the sealing collar makes a very tight joint between the shoulder 15 and the gasket on the under side of the cover 15.

Some changes may be made in the construction of the parts of my device, as will be seen from the foregoing description without departing from the real spirit and purpose of my invention, and it is my purpose to cover by my claims, any modified forms of structure or use of mechanical equivalents, which may be reasonably included within there scope.

With my sealing device, proper attention can be given to burning the posts to the terminals and connectors to insure the securing of maximum conductivity, and the posts can be thoroughly sealed with relation to the covers, so as to prevent the escape of electrolyte or acid fluid from the battery around the posts.

The sealing collars and the connectors or terminals or sleeves, as the case may be, which coact with the collars are preferably made of lead composition. One of the coacting members should be made with more antimony than the other to make it harder. When this is done and the collar is rotated from one position to the other, as mentioned above, the harder member presses into the softer member and there is no danger of accidental rotation of the collar to position for loosening the seal. I preferably make the collar harder and the connector softer, because the connector has to endure greater strain in use, and when softer is less liable to break.

I claim as my invention:

1. In a sealing device for storage battery cells, the combination with a cover member having a hole therein, a post extended through said hole, said post having a shoulder, a gasket surrounding the post between the shoulder and the bottom of the cover member, a connector mounted on the upper part of the post and burned thereto, a sealing and locking collar rotatably mounted on the post between the connector and the cover member, said collar and connector having respectively on their adjacent surfaces a projection and a recess provided with inclined surfaces, the parts being so constructed that they may be assembled and the connectors burned on when the projection is received in the recess and thereafter the collar may be engaged and rotated for causing the projection to ride out of said recess for forcing the shoulder of the post on which the collar is mounted against the gasket for effecting a tight seal.

2. In a sealing device for storage battery cells, the combination with a cover member having a hole therein, formed with a rabbet at its lower portion, a post extended through said hole, said post having a shoulder, a gasket in said rabbet surrounding the post between the shoulder and the bottom of the cover member, a connector mounted on the upper part of the post and burned thereto, a sealing and locking collar rotatably mounted on the post between the connector and the cover member, said collar and connector having respectively on their adjacent surfaces a projection and a recess provided with inclined surfaces, the parts being so constructed that they may be assembled and the connectors burned on when the projection is received in the recess and thereafter the collar may be engaged and rotated for causing the projection to ride out of said recess for forcing the shoulder of the post on which the collar is mounted against the gasket for effecting a tight seal.

3. In a sealing device for storage battery cells, the combination with a cover member having a hole therein, a post extended through said hole, said post having a shoulder, a gasket surrounding the post between the shoulder and the bottom of the cover member, a sleeve on the upper portion of said post, a connector mounted on said sleeve, said connector and said sleeve and post being burned together, a sealing and locking collar rotatably mounted on the post between the connector and the sleeve, said collar and connector having respectively on their adjacent surfaces a projection and a recess provided with inclined surfaces, the parts being so constructed that they may be assembled and the connectors burned on when the projection is received in the recess and thereafter the collar may be engaged and rotated for causing the projection to ride out of said recess for forcing the shoulder of the post on which the collar is mounted against the gasket for effecting a tight seal.

4. In a sealing device for storage batteries, the combination of a storage battery having a casing and cells with covers for said cells, said covers having holes therein with rabbets at their lower portions, gaskets in said rabbets, a post extended through one of said holes having a shoulder for engaging the corresponding gasket, a sleeve on the upper part of said post spaced from the adjacent cover provided with a flange at its lower part, a conducting member mounted on said sleeve and burned to said post, and said sleeve, a sealing collar rotatably mounted on said post between said sleeve and the adjacent cover, said collar and said sleeve having substantially flat surfaces provided with corresponding recesses and projections formed with inclined surfaces, whereby the parts may be assembled with the projections received in the respective recesses and the conducting member burned in place, and thereafter the collar may be rotated for causing the projections to ride out of the recesses onto a flat surface.

Des Moines, Iowa, August 16, 1920.

WENDELL H. CALDBECK.